United States Patent Office 2,937,135
Patented May 17, 1960

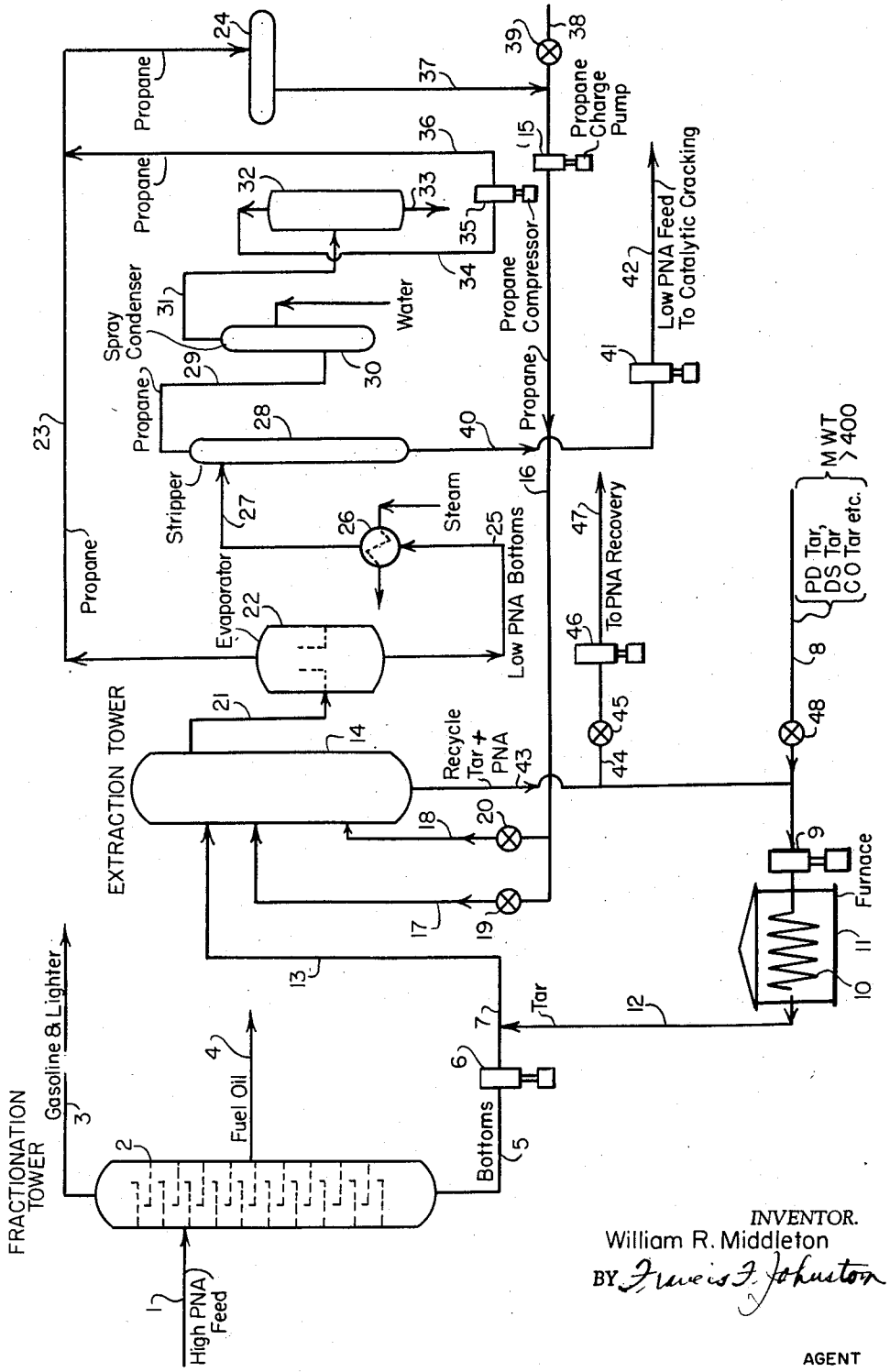

2,937,135
EXTRACTION OF POLYNUCLEAR AROMATIC MATERIALS

William R. Middleton, Wenonah, N.J., assignor to Socony Mobil Oil Company, Inc., a corporation of New York Application August 1, 1957, Serial No. 675,717

6 Claims. (Cl. 208—96)

The present invention relates to the extraction of polynuclear aromatic materials from a mixture containing aliphatic and polynuclear aromatic materials and, more particularly, to the extraction of polynuclear aromatic materials from hydrocarbon mixtures to be cracked either thermally or catalytically.

It has been discovered that liquefiable asphaltic materials, e.g., asphaltic resins, petroleum vacuum tars, propane deasphalting tars, Duo-Sol tars, coal tars and the like are selective solvents for aromatic compounds and for polynuclear aromatic compounds particularly. Thus, when two relatively immiscible liquids, one of which is an asphaltic tar such as enumerated hereinbefore, are contacted with a mixture of polynuclear aromatic and aliphatic materials, the polynuclear aromatic materials are selectively dissolved by the asphaltic tar. When the liquid relatively immiscible in the asphaltic tar is a solvent for the aliphatic material, a very good, if not essentially quantitative separation of the aromatic and aliphatic material results.

It is well-known that in catalytic cracking of mineral oil the recycle stock is more refractory than the fresh feed. Furthermore, it can be demonstrated that the portion of syn-tower bottoms having the higher concentration of polynuclear aromatic materials is a poorer feed to a catalytic cracking reactor than the portion of the syn-tower bottoms having the lower concentration of polynuclear aromatic materials. Thus, a syn-tower bottoms having the characteristics given in Table I was fractionated through a column of activated alumina to provide two fractions having the characteristics set forth in Table II. The whole syn-tower bottoms, and each of the fractions thereof were cracked over a silica-alumina catalyst in the well-known "Cat A Test" using 32 activity index bead catalyst. The conditions of this "Cat A Test" and the results thereof are set forth in Table III.

TABLE I

| | Syn-tower bottoms |
|---|---|
| Sp. gr., 77°/77° F. | 0.955 |
| Refractive index, $n_D^{50}$ | 1.5481 |
| Viscosity, K.V. | |
| Flash point, ° F. | 325 |
| Pour point, ° F. | 95 |
| Molecular weight | 350 |
| Aromatics, percent volume | 47 |
| A.S.T.M. distillation: | |
| Initial, ° F. | 620 |
| 5%, ° F. | 655 |
| Percent at 650° F. | 3 |

TABLE II
Chromatographic separation of syn-tower bottoms

| | Fraction A | Fraction B |
|---|---|---|
| Volume Percent of STB | 53 | 47 |
| Density, $d_4^{20}$ | 0.82 | 1.110 |
| Refractive Index $n_D^{20}$ | 1.4700 (approx.) | 1.665 |
| Atomic Ratio, H/C | 1.95 | 0.95 |

TABLE III
[Catalyst: Standard, 31 activity index chrome-silica-alumina beads.[1]]

| Charge Stock | Whole STB[2] | Aliphatic[3] Portion of STB | PNA[4] and Resins from STB |
|---|---|---|---|
| Average Reactor Temp., ° F. | 851 | [5]838 | 861 |
| Vapor Inlet Temp., ° F. | 889 | 891 | 891 |
| Space Velocity, v./hr./v. | 1.5 | 1.5 | 1.5 |
| Catalyst to Oil Ratio | 4.0 | 4.0 | 4.0 |
| Sp. Gr. 77/77 ° F. | 0.907 | 0.815 | 1.0915 |
| 10 RVP gasoline | 21.3 | 35.3 | 4.0 |
| Percent Volume of charge stock | | | |
| Gas, percent weight of charge stock | 10.3 | 23.6 | 4.6 |
| Coke, percent weight of charge stock | 6.9 | 1.8 | 16.3 |
| Gasoline to coke ratio | 3.09 | 19.6 | 0.25 |
| Conversion, percent volume of charge stock | 34.0 | 52.6 | 23.3 |

[1] 0.15% by weight chromium oxide; 89.35% by weight silica; 9.75% by weight alumina; 0.75% water.
[2] Syn-tower bottoms.
[3] 66% by volume of whole STB.
[4] 22% by volume of whole STB.
[5] Average temperature low because of vigorous endothermic reaction.

A study of the data presented in Table III makes it manifest that separation of the polynuclear (P.N.A.) aromatic material from the syn-tower bottoms (S.T.B.) produces a feed for catalytic cracking far superior to the total syn-tower bottoms. However, chromatographic separation of syn-tower bottoms is not practical as an industrial method of improving feed stocks for catalytic cracking which contain polynuclear aromatic materials. On the other hand, extraction of the polynuclear aromatic material from syn-tower bottoms with an asphaltic tar provides an industrially attractive method for improving such a charge stock for catalytic cracking.

A syn-tower bottoms having the characteristics set forth in Table I was extracted in a rocking autoclave with propane and a tar recovered from a propane deasphalting operation having the charactertistic set forth in Table IV.

TABLE IV

| | Propane deasphalting tar |
|---|---|
| Sp. gr., 77°/77° F. | 1.038 |
| Viscosity, K.V. | 343.1 |
| Flash point, ° F. | 675 |
| Average molecular weight | >1,000 |

The extraction conditions, products obtained, and conditions under which the refined oil was cracked are presented in Table V.

TABLE V

| | Propane deasphalting tar |
|---|---|
| Extraction stage | 1 |
| Equilibrium temp., ° F. | 130 |
| Charge: | |
| P.D. tar, vols. | 1.87 |
| S.T.B., vols. | 1.00 |
| S.T.B., sp. gravity, 77°/77° F. | 0.955 |
| Propane, vols. | 7.3 |
| Products: | |
| Tar, vols. | 2.11 |
| Sp. gr., 77°/77° F. | 1.0491 |
| Viscosity, K.V. at 300° F. | 92.7 |
| R.&B., M.P., °F. | 102.5 |
| Refined oil (S.T.B), vol. | 0.715 |
| Sp. gr., 77°/77° F. | 0.9154 |
| Refractive index, $n_D^{20}$ | 1.5243 |
| H/C, atomic ratio | 1.702 |

Cracking of refined oil (S.T.B.): Catalyst—Standard 31 activity index chrome-silica-alumina bead.

TABLE V—Continued

Propane deasphalting tar

| | |
|---|---|
| Average reactor temp., °F. | 846 |
| Vapor inlet temp., °F. | 880 |
| Space velocity, v./v./hr. | 1.5 |
| Catalyst to oil ratio | 4.0 |
| 10 R.V.P. gasoline, percent vol. | 33.6 |
| Gas, wt. percent | 15.9 |
| Coke, wt. percent | 7.7 |
| Conversion, vol. percent | 43.4 |

Another lot of the syn-tower bottoms (S.T.B.) was extracted twice under the conditions set forth in Table VI and catalytically cracked under the conditions set forth in Table V.

TABLE VI

| Extraction Stage | 1 | 2 |
|---|---|---|
| Equilibrium Temp., °F | 150 | 149 |
| Charge: | | |
| Propane Deasphalting Tar, Vols | 1.91 | 1.25 |
| S.T.B., Vols | 1.0 | [1] 0.69 |
| S.T.B., Sp. Gr. 77°/77° F | 0.955 | 0.9129 |
| Propane, Vols | 7.5 | 7.5 |
| Products: | | |
| Tar, Vols | 2.19 | |
| Tar Sp. Gr. 77°/77° F | 1.0503 | 1.0309 |
| Tar Viscosity, K.V. at 300° F | 93.8 | 133.4 |
| Tar R.&B., M.P., °F | 97 | 108 |
| Refined Oil, Vols | 0.69 | 0.51 |
| Sp. Gr. 77°/77° F | 0.9129 | 0.8999 |
| R.I. $n_D^{20}$ | 1.5231 | 1.5087 |
| H/C, atomic ratio | 1.715 | 1.768 |

[1] Raffinate from first stage.

When the raffinate or refined oil of the second extraction stage was catalytically cracked under the following conditions the refined oil yielded the products in the yields indicated in Table VII.

Cracking conditions:
Catalyst—31 activity index chrome-silica-alumina beads.

| | |
|---|---|
| Average reactor temp., °F. | 846 |
| Vapor inlet temp., °F. | 880 |
| Space velocity, v./hr./v. | 1.5 |
| Catalyst to oil ratio | 4.0 |

TABLE VII

Charge: Raffinate from second extraction stage.
Products:

| | |
|---|---|
| 10 R.V.P. gasoline, percent vol. of charge | 35.2 |
| Gas, weight percent | 15.7 |
| Coke, weight percent | 7.3 |
| Conversion, vol. percent | 49.7 |

The effect of tar extraction of S.T.B. upon the cracking characteristics of the S.T.B. as illustrated by the foregoing data is summarized in Table VIII.

TABLE VIII

| Products | S.T.B. | Once Extracted S.T.B. | Twice Extracted S.T.B. |
|---|---|---|---|
| 10 R.V.P. Gasoline, Percent Vol. of Charge | 21.3 | 33.6 | 35.2 |
| Gas, Weight Percent | 10.3 | 15.9 | 15.7 |
| Coke, Weight Percent | 6.9 | 7.7 | 7.3 |
| Conversion, Vol. Percent | 34.0 | 43.4 | 49.7 |
| Gasoline to Coke Ratio | 3.09 | 4.36 | 4.82 |

To illustrate the use of tar as a selective solvent even for mononuclear aromatic hydrocarbons, a catalytic reformate containing only mononuclear aromatic hydrocarbons was extracted with a two component solvent. The conditions, solvent to oil ratio, and products produced are set forth in Table IX.

TABLE IX

| | |
|---|---|
| Extraction stage | 1 |
| Equilibrium temp., °F. | 100 |
| Time, hrs. | 3 |
| Charge: | |
| P.D. tar, vols. | 3.0 |
| Propane-ethane mixture [1] | 6.6 |
| Reformate | 1.0 |
| Sp. gr. 60°/60° F. | 0.783 |
| Refractive index, $n_D^{20}$ | 1.4480 |
| Mononuclear aromatics, percent | .55 |
| Products: | |
| Tar phase (propane free), vol. | 3.0 |
| Aromatic concentrate, vol. | 0.23 |
| Spr. gr., 60°/60° F. | 0.812 |
| Refractive index, $n_D^{20}$ | 1.4623 |

[1] Weight ratio propane : ethane, 3.2 : 1.

The specific gravity and the refractive index of the aromatic concentrate when compared with the same characteristics of the reformate indicate that the aromatic content of the concentrate is considerably higher than the aromatic content of the reformate.

Suitable asphaltic tar solvents are illustrated by the characteristics of four tar solvents presented in Table X.

TABLE X

| | Kuwait P.D. Tar [1] | Duo-Sol Tar [2] | Kuwait Short Residuum | West Texas Short Residuum |
|---|---|---|---|---|
| Sp. Gr., 60°/60° F | 1.042 | 1.022 | 1.020 | 1.040 |
| Mol. Wt | >1,000 | >870 | >880 | > 1,300 |
| Composition [3] | | | | |
| Paraffinic Const.,[4] Percent Vol | 5.9 | 16.0 | 14.1 | 12.1 |
| Polynuclear Aromatic Oil,[5] Percent Vol | 27.7 | 18.7 | 27.5 | 24.4 |
| Soft Resins,[6] Percent Vol | 23.1 | 24.3 | 19.8 | 17.7 |
| Hard Resins,[7] Percent Vol | 28.0 | 27.8 | 26.3 | 29.4 |
| Asphaltenes, Percent Wt | 17.0 | 15.0 | 14.0 | 18.0 |

[1] P.D. Tar—tar recovered in propane deasphalting Kuwait reduced crude.
[2] Duo-Sol Tar—tar recovered in Duo-Sol treatment of mixed base reduced crude.
[3] Arrived at by precipitation of asphaltenes followed by elution analysis of remainder from column of activated alumina.
[4] Constituents having refractive indices ($n_D^{20}$) ranging up to 1.500–1.505. Includes most of the non-condensed aromatics.
[5] Viscous polynuclear aromatic oils ranging in refractive index ($n_D^{20}$) from 1.500–1.570.
[6] Polynuclear aromatics having resinous properties due to large number of condensed aromatic rings.
[7] Resins not eluted from activated alumina by benzene or benzene-cyclohexane mixtures.

While the present invention contemplates in its broader aspects the treatment of any stock with a tar fluid at extraction temperatures of 100° F. or greater to remove the polynuclear aromatic material and, in general, the extraction of aromatic material including mono-, as well as poly-nuclear aromatic material with liquefiable tar or asphaltic materials, e.g., asphaltic resins, petroleum vacuum tars, propane deasphalting tars, coal tars and the like, the invention is illustrated by the flowsheet of the drawing.

The hydrocarbon mixture which can be treated is any hydrocarbon mixture containing aromatic hydrocarbons or aromatic material. The extraction of mono-nuclear aromatic material is not quantitative but the efficiency of extraction increases as the number of aromatic rings in the molecule increases until it is substantially quantitative for aromatic material having four rings in the molecule. Accordingly, any hydrocarbon mixture containing aromatic hydrocarbons and, particularly, polynuclear aromatic hydrocarbons (P.N.A.) can be treated to remove the aromatic material by intimate contact with an asphaltic tar as solvent for the aromatic material and a solvent for non-aromatic material which is substantially immiscible with the asphaltic tar.

Ethane can be used in the paraffinic solvent. The maximum amount of ethane which is soluble in the liquid paraffins at the selected operating temperature and pressure is used. At 100–150° F. and the autogenous pressure the ethane concentration is within the range of about 10 to about 25 percent.

Pentanes can also be used alone or in admixture with the lower paraffins. However, pentanes alone tend to form a single liquid phase with the asphaltic tar. This tendency to form a single liquid phase with the asphaltic tar requires the use of higher operating temperatures approaching the critical temperatures of the mixtures of the paraffins. These higher operating temperatures required when pentane alone is the paraffinic solvent affects the proper functioning of the selective asphaltic solvent. Accordingly, pentane alone is not preferred as the paraffinic solvent.

Butanes and pentanes alone likewise affect the proper functioning of the selective asphaltic solvent. Consequently, it is preferred to use mixtures of propane with butanes and/or pentanes in which for normal operating temperatures of about 100° to about 180° F., the total mol percent of butanes plus pentanes does not exceed about 25 percent. At higher operating temperatures the concentration of butanes and/or pentanes can be higher.

When employing butanes alone operating temperatures above about 100° to about 180° F. are required for higher selective extraction of the polynuclear aromatic hydrocarbons. As propane is added to the butanes lower extracting temperatures can be used.

The critical temperatures of the paraffins having two to five carbon atoms are as follows:

| Hydrocarbon: | Critical temperature, °F. |
| --- | --- |
| Ethane | 90 |
| Propane | 204 |
| n-Butane | 308 |
| Isobutane | 274 |
| n-Pentane | 387 |
| Isopentane | 370 |

Methanol and mixtures of methanol and ethanol are immiscible with the selective "asphaltic tar" solvents and can be used alone or in combination with the paraffinic solvents.

Illustrative of the solvents for non-aromatic material are the hydrocarbons having 2 to 5 carbon atoms and particularly propane, or mixtures of propane with one or more of ethane, butane, isobutane and one or more of the pentanes. The corresponding olefins can also be employed in minor amounts in conjunction with propane. Accordingly, the solvent for paraffinic hydrocarbons which solvent is substantially immiscible with the solvent for the aromatic material is low-boiling for ease of separation from high boiling paraffinic materials and from the asphaltic tars. Liquid ethane and liquid propane or mixtures of ethane and propane presently appear to be the best solvents for this purpose. Isobutane and normal butane can be used when mixed with sufficient propane or alone when used at temperatures within about 20 to about 40 degrees of the critical temperature of 274° and 308° F., respectively. (At lower temperatures the butanes retain excessive amounts of the polynuclear aromatics in solution.)

The amount of substantially immiscible solvent for paraffinic material necessary for use in the process varies. The primary requisite is that in all cases a sufficient volume of the solvent for paraffinic material be present to cause the formation of a distinct and readily separable paraffinic phase, i.e., a phase comprising the solvent for paraffinic material and dissolved paraffinic material. Usually about 1.5 to about 3.0 volumes of asphaltic tar is used per volume of stock containing aromatic material that is to be extracted. Four to five volumes of solvent for paraffinic material usually is sufficient to provide a distinct readily separable paraffinic phase. In other words, the oil:tar:propane volumetric ratio is usually 1:1.5–3:4–5. (Propane being used to designate broadly or generically the solvent for paraffinic materials.)

The asphaltic materials suitable for use as solvents for aromatic material and particularly polynuclear aromatic materials are generally petroleum residues, i.e., propane deasphalting tars, "Duo-Sol" tars, and similar tars which are products of solvent treating of petroleum residues. Asphaltic tars having average molecular weights as low as 400–600 have been prepared. However, normally the average molecular weights of asphaltic tars are greater than about 400–600. Coal tar residues prepared as vacuum tars having average molecular weights in excess of about 400 are satisfactory.

Illustrative of the range of asphaltic compositions suitable for use as solvents for aromatic material and particularly polynuclear aromatic material are those set forth in Table X.

All of the asphaltic tars of Table X are shown to contain the same five basic ingredients. For the purposes described herein the paraffinic constituents may be considered as an undesirable component of the asphaltic tars. Being paraffinic, they detract from the selective solvent action which is sought. The main action of these constituents is to lower the softening point and viscosity of the tars. Since the same effect may be gotten from the presence of aromatics, the paraffinic constituents preferably do not exceed a concentration of about 10 percent volume. Note, however, that in use this component of the asphaltic tar would be gradually removed by solution in the aliphatic solvent phase. Thus, at the outset, it is possible to start with more than the preferred amount of the paraffinic constituents.

The polynuclear aromatic oil component plays a vital role as a dispersant or solvent for the hard resins and asphaltenes. This component is the most similar to the material which is to be selectively dissolved. Since this component is rather soluble in aliphatic solvents, its concentration should not be excessive. The preferred range is about 10–35 percent by volume.

The soft polynuclear resin component, as an intermediate between the P.N.A. oil and the hard resins, also plays an important role as a dispersant and homogenizer. The preferred range is about 20–40 percent by volume.

The hard resins constitute the first strictly asphaltic component of the tars. The presence of this component is essential. Otherwise the immiscible asphalt phase would not form and the two-solvent-type separation would not be possible. The preferred concentration of this component is about 20–40 percent by volume.

The asphaltenes are the highest molecular weight, least soluble portion of an asphalt. Its function is that of lowering the solubility of the asphalt in aliphatic solvents. All virgin asphaltic tars are believed to contain asphaltenes. Asphalts containing over about 25 percent of asphaltenes except when the amount of hard resins is quite low have too high a melting point for the purposes of the present invention. Accordingly, a suitable asphaltic tar comprises about:

|  | Broad Range, Vol. Percent | Preferred Range, Vol. Percent |
| --- | --- | --- |
| Predominantly Paraffinic Material | 0–20 | not >10 |
| Polynuclear Aromatic Oil | 5–50 | 10–35 |
| Soft Polynuclear Aromatic Resin | 10–60 | 20–40 |
| Hard Resin (Asphaltic Component) | 10–50 | 20–40 |
| Asphaltenes (Asphaltic Component) | 0–25 | 5–15 |
| Hard Resin plus Asphaltenes | 25–55 | 35–45 |

The process of the present invention can be used to increase the aromatic content or conversely reduce the paraffinic content of a large variety of materials produced or occurring in the refining of petroleum and similar hydrocarbon mixtures. Thus, heavy recycle stocks from catalytic cracking such as the syn-tower bottoms discussed hereinbefore can be treated. Similar stocks which can be treated are S.T.B. from thermal cracking and cycle stocks from coking operations. Coker gas oils can be upgraded as catalytic cracking stocks and the extracted P.N.A. distilled from the asphalt and sold as special aromatic oils. Furfural extracts containing aromatics useful in the manufacture of special asphalts also contain an excessive amount of paraffinic material. Blending of the furfural extracts with asphalt base stocks is limited by the paraffinic content. By using all or part of the asphalt base stock, or flux, as the selective solvent, the aromatic portion of the extract may be selectively blended with the asphalt base. In this way the undesired paraffinic component may be recovered as high quality cracking stock.

Thus, the present invention provides a means for separating predominantly aromatic material, particularly tri- and higher polynuclear aromatic material, from predominantly paraffinic material in a two-solvent manner employing a solvent for more paraffinic material comprising paraffinic hydrocarbons having a 2–5 carbon atoms in the molecules and particularly propane and ethane alone or in admixture and the olefinic analogues thereof or, preferably anhydrous, methanol, or methanol mixed with not more than about 50 percent by volume ethanol (preferably anhydrous) and a solvent for the more aromatic material comprising asphaltic tars as defined hereinbefore.

Illustrative of the treatment of a cracking stock is the treatment of syn-tower bottoms as illustrated by the flowsheet of the drawings. Thus, for example, the effluent from a catalytic cracking reactor flows from a source not shown through pipe 1 to fractionating tower 2. In fractionating tower 2 the reactor effluent is fractionated usually into an overhead withdrawn through pipe 3 comprising gasoline and lighter hydrocarbons, one or more side streams such as light and heavy fuel oil withdrawn as indicated through pipe 4 and a bottoms boiling above about 650° F.

The bottoms is usually returned at least in part to the catalytic cracking zone. However, in accordance with the principles of the present invention, the bottoms of the fractionator, i.e., the syn-tower bottoms, flow through pipe 5 to the suction side of pump 6. Pump 6 discharges the syn-tower bottoms into pipe 7 at a pressure sufficiently above that of extraction tower 14 to provide for any pressure drop between pump 6 and tower 14.

Any material having the characteristics of the asphalt tars described in Table X, for example, asphaltic tar obtained from a propane deasphalting process is drawn from a source not shown through conduit 8 by pump 9. Pump 9 discharges the asphaltic tar into coil 10 of heater or furnace 11 where the asphaltic tar is heated to a temperature at which it is liquid and at which when mixed with the material to be extracted, i.e., in this instance the syn-tower bottoms, the mixture is at extraction temperature. Extraction temperature for an extraction tower such as illustrated is about 160° to about 185° F. top tower temperature and about 130° to about 150° F. bottom tower temperature or, in general, the extraction temperature is about 140° to about 170° F.

The heated asphaltic tar flows from coil 10 through conduit 12 to pipe 7 where it is mixed with the stock to be extracted, in the illustration syn-tower bottoms. The mixture of stock and asphaltic tar flows through pipe 7 to conduit 13 and then to extraction tower 14.

Propane, either recycled or fresh or a mixture of recycled and make-up propane obtained as hereinafter described flows from pump 15 through pipe 16 to pipes 17 and 18 under control of valves 19 and 20. The propane is distributed between pipes 17 and 18 in the ratio of about 1 to 2.

The stock to be treated together with the asphaltic tar flows downwardly through extraction tower 14 countercurrently to the upwardly flowing propane. The propane extracts the more paraffinic components of the mixture of stock to be treated and flows from extraction tower 14 through pipe 21 to evaporator 22, where the propane is volatilized by reducing the pressure. The pressure in the extraction tower is sufficient to maintain the propane liquid at the temperature of the extraction tower and usually is about 280 to about 400 p.s.i.g.

The volatilized propane flows from evaporator 22 through pipe 23 to propane accumulator 24.

The unvolatilized bottoms comprising propane and extracted paraffinic material flows from evaporator 22 through pipe 25 to heat exchanger 26 where the temperature is raised sufficiently to volatilize the residual propane in the evaporator bottoms. The heat exchange can be direct with a readily separable heat carrier or can be indirect with steam as indicated. From heat exchanger 26 the heated evaporator bottoms flows through pipe 27 to stripper 28.

In stripper 28 the residual propane is taken overhead through pipe 29 to condenser 30 in which the residual propane is cooled by direct contact with a cooling medium, preferably water and preferably as a spray. The cooled residual propane and cooling water flow from condenser 30 through pipe 31 to separator 32 where the water is drawn off through pipe 33. The residual propane is withdrawn from separator 32 through pipe 34 by pump 35. Pump 35 discharges into pipe 36. The residual propane flows through pipe 36 to pipe 23 where the residual propane is mixed with the propane flowing from evaporator 22. The mixed propanes flow through pipe 23 to accumulator 24. From accumulator 24 the propane is drawn by pump 15 through pipe 37. Fresh or make-up propane is drawn from a source not shown through pipe 38 under control of valve 39 as needed or desired. Pump 15 discharges the propane into pipe 16 through which the propane flows to extraction tower 14 as described hereinbefore.

Returning now to stripper 28, the material extracted by the propane which with the residual propane forms the bottoms of evaporator 22 is stripped of propane in stripper 28 to form a bottoms fraction. The stripper bottoms is low in polynuclear aromatic material and is an excellent stock for catalytic cracking. The stripper bottoms flows from stripper 28 through pipe 40 to the suction side of pump 41. Pump 41 discharges the stripper bottoms into pipe 42 through which the stripper bottoms flows to catalytic cracking or other use.

Returning now to extraction tower 14, the flow of the propane phase having been described, it remains only to describe the flow of the asphaltic tar phase containing the extracted aromatic material.

The asphaltic tar extracts the aromatic material, particularly the polynuclear aromatic material from the feed stock. The mixture of asphaltic tar and extracted aromatic material flows from extraction tower 14 through conduit 43. A portion of the tar phase is withdrawn through conduit 44 under control of valve 45 by pump 46. Pump 46 discharges into conduit 47 through which the asphaltic tar and polynuclear aromatic material flow to suitable recovery means, as for example, a vacuum distillation tower (not shown) where the polynuclear aromatic material is taken as overhead and the asphaltic tar recycled to the suction side of pump 9. The balance of the extraction tower bottoms flows through conduit 43 to the suction side of pump 9 for reheating and recycle to extraction tower 14. From time to time make-up asphaltic tar is drawn from a source not shown through conduit 8 under control of valve 48 and mixed with the recycle asphaltic tar.

I claim:

1. A method of extracting aromatic material from mixtures containing aromatic and paraffinic material which comprises contacting a liquid mixture comprising paraffinic material and aromatic material with two substantially immiscible liquid solvents to obtain a liquid two-phase mixture separable into a first liquid phase and a second liquid phase, one of the aforesaid liquid substantially immiscible solvents being a solvent for paraffinic material and the other of the aforesaid liquid substantially immiscible solvents being a liquid asphaltic tar containing by volume about 10 to about 60 percent soft polynuclear aromatic resin, about 10 to about 50 percent of hard resin, about 5 to about 50 percent of polynuclear aromatic oil, up to about 25 percent of asphaltenes, balance to make 100 percent predominantly paraffinic material, and the amount of hard resin plus asphaltenes being about 25 to about 55 percent, separating the aforesaid liquid two-phase mixture into a first liquid phase comprising the aforesaid liquid solvent for paraffinic material and extracted paraffinic material and a second liquid phase comprising the aforesaid liquid asphaltic tar and extracted aromatic material, and separating liquid solvent for paraffinic material from extracted paraffinic material.

2. The method as set forth in claim 1 wherein the separated paraffinic material is cracked.

3. The method as set forth in claim 1 wherein aromatic material is separated from said second phase.

4. The method as set forth in claim 1 wherein separated solvent for paraffinic material is recycled.

5. In the catalytic cracking of petroleum mixture boiling above the gasoline boiling range wherein in a cracking zone a mixture comprising hydrocarbons is cracked in the presence of a particle-form solid cracking catalyst to produce reaction products, wherein said reaction products are fractionated to obtain a bottoms product boiling above the gasoline boiling range, wherein a portion of said bottoms product is recycled to said cracking zone, and wherein a portion of said bottoms product is discarded, the improvement which comprises contacting said bottoms product with two substantially immiscible liquid solvents to obtain a liquid two-phase mixture separable into a liquid raffinate phase and a liquid extract phase, one of the aforesaid liquid substantially immiscible solvents being a solvent for paraffinic material and the other of the aforesaid liquid substantially immiscible solvents being a liquid asphaltic tar containing by volume about 10 to about 60 percent soft polynuclear aromatic resin, about 10 to about 50 percent of hard resin, about 5 to about 50 percent of polynuclear aromatic oil, up to about 25 percent of asphaltenes, balance to make 100 percent predominantly paraffinic material, and the amount of hard resin plus asphaltenes being about 25 to about 55 percent, separating the aforesaid liquid two-phase mixture into a liquid raffinate phase comprising said liquid solvent for paraffinic material and extracted paraffinic material and a liquid extract phase comprising said liquid asphaltic tar and extracted aromatic material, separating extracted paraffinic material from liquid solvent for paraffinic material, and recycling said separated paraffinic material to the aforesaid cracking zone.

6. The improvement in catalytic cracking as set forth and described in claim 5 wherein the liquid solvent for paraffinic material and the liquid asphaltic tar are recycled to said extraction zone.

References Cited in the file of this patent
UNITED STATES PATENTS

| | | |
|---|---|---|
| 2,367,385 | Weeks et al. | June 16, 1945 |
| 2,700,637 | Knox | Jan. 25, 1955 |
| 2,727,853 | Hennig | Dec. 20, 1955 |
| 2,775,544 | Corneil et al. | Dec. 25, 1956 |
| 2,834,715 | Pratt | May 13, 1958 |
| 2,853,426 | Peet | Sept. 23, 1958 |
| 2,882,219 | Johnson | Apr. 14, 1959 |
| 2,886,522 | Cooper et al. | May 12, 1959 |